US009387907B2

(12) United States Patent
Nasca et al.

(10) Patent No.: US 9,387,907 B2
(45) Date of Patent: Jul. 12, 2016

(54) FRONT BODY FOR SNOWMOBILE

(71) Applicant: Yamaha Hatsudoki Kabushiki Kaisha, Iwata-shi, Shizuoka (JP)

(72) Inventors: Lauren Nasca, Woodruff, WI (US); David Flessert, Phillips, WI (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/548,378

(22) Filed: Nov. 20, 2014

(65) Prior Publication Data
US 2016/0144930 A1 May 26, 2016

(51) Int. Cl.
*B62M 27/02* (2006.01)
(52) U.S. Cl.
CPC ......... *B62M 27/02* (2013.01); *B62M 2027/026* (2013.01); *B62M 2027/028* (2013.01)
(58) Field of Classification Search
CPC ........... B62M 27/02; B62M 2027/026; B62M 2027/028
USPC ................................................. 180/190, 68.1
See application file for complete search history.

(56) References Cited

U.S. PATENT DOCUMENTS

| 5,427,430 | A | * | 6/1995 | Peterson | B62D 35/005 180/903 |
| 5,503,242 | A | | 4/1996 | Jeffers | |
| 5,992,552 | A | * | 11/1999 | Eto | B62M 27/00 180/190 |
| 6,263,991 | B1 | | 7/2001 | Savage et al. | |
| 6,595,309 | B1 | | 7/2003 | Savage et al. | |
| 2006/0175106 | A1 | * | 8/2006 | Vaisanen | B62M 27/00 180/190 |
| 2007/0119650 | A1 | | 5/2007 | Eide | |
| 2007/0158123 | A1 | * | 7/2007 | Brodeur | B62M 27/02 180/68.1 |
| 2009/0021043 | A1 | * | 1/2009 | Auger | B62J 19/00 296/136.07 |
| 2009/0206626 | A1 | * | 8/2009 | Bedard | B60N 2/01516 296/66 |
| 2009/0322045 | A1 | * | 12/2009 | Lemieux | B62B 17/04 280/28 |
| 2010/0163329 | A1 | * | 7/2010 | Bergman | B60R 19/52 180/292 |

* cited by examiner

*Primary Examiner* — Anne Marie Boehler
*Assistant Examiner* — Marlon Arce
(74) *Attorney, Agent, or Firm* — Keating and Bennett, LLP

(57) ABSTRACT

A snowmobile includes a frame, an engine mounted on the frame, a pair of skis connected to the frame, and a front body including a nose cone, a pair of side panels, and a hood covering a front portion of the frame. The nose cone, the pair of side panels, and the hood are preferably made of plastic.

19 Claims, 7 Drawing Sheets

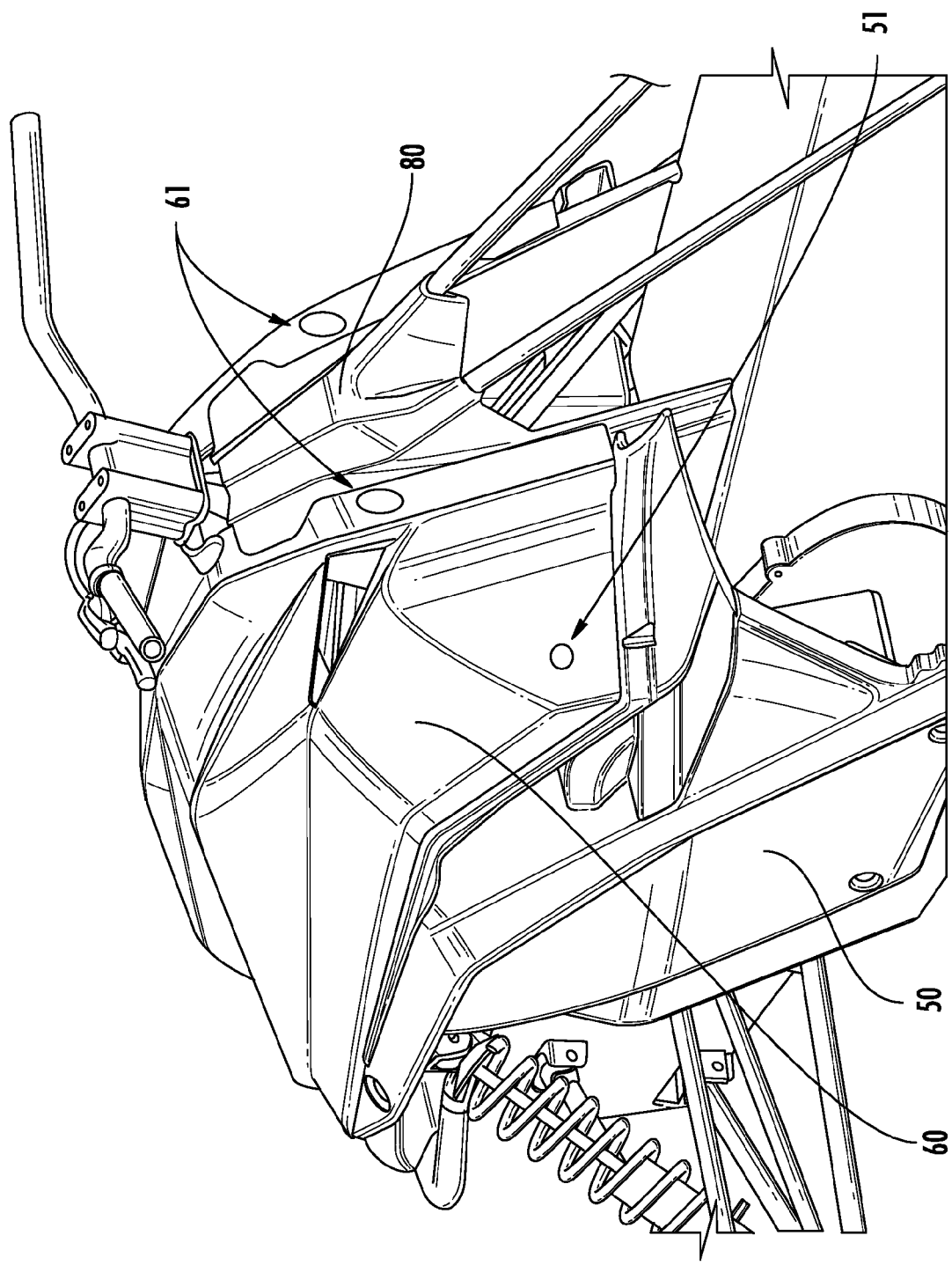

FRONT BODY FOR SNOWMOBILE

BACKGROUND OF THE INVENTION

1. Field of the Invention

The present invention relates to a snowmobile. More specifically, the present invention relates to a front body of a snowmobile.

2. Description of the Related Art

Conventionally, a front body of a snowmobile includes one or more body panels made of metal covering the front of the snowmobile to protect the internal components, such as the engine, disposed at the front of the snowmobile and to provide overall strength to the body of the snowmobile. The one or more metal body panels also protect humans from the internal components of the snowmobile.

SUMMARY OF THE INVENTION

The inventors of preferred embodiments of the present invention described and claimed in the present application have discovered that conventional metal body panels at the fronts of snowmobiles provided unnecessary and excessive strength that was far more than required to meet the functional needs of the snowmobile, which caused problems with excess weight and cost. Accordingly, preferred embodiments of the present invention replace the metal body panels with plastic body panels in order to reduce the weight of the snowmobile, while also protecting the internal components of the snowmobile from snow and other debris and humans from the internal components of the snowmobile.

According to a preferred embodiment of the present invention, one or more of the plastic body panels are designed and configured to be easily attached to and detached from the snowmobile so as to facilitate maintenance of the snowmobile, for example, maintenance of the engine. One or more of the plastic body panels are preferably attached to and detached from the snowmobile with the use of simple tools or without the use of any tools. Thus, maintenance on the snowmobile, including maintenance of the engine, may be quickly performed. This is particularly beneficial during, for example, a snowmobile race in which the rider of the snowmobile needs to quickly perform emergency maintenance on the snowmobile.

Although the conventional metal body panels are replaced with plastic body panels, the necessary strength and rigidity of the snowmobile is maintained by preferably using a metal tube frame structure, or similar metal frame structure. The metal tube frame structure provides the functional requirements of strength and rigidity of the snowmobile while the plastic body panels provide the functional requirements of protecting the internal components of the snowmobile from snow and other debris, while also protecting humans from the internal components of the snowmobile.

A preferred embodiment of the present invention provides a snowmobile including a frame, an engine mounted on the frame, a pair of skis connected to the frame, and a front body including a nose cone, a pair of side panels, and a hood covering a front portion of the frame. The nose cone, the pair of side panels, and the hood are preferably made of plastic.

Preferably, the nose cone includes a front surface and side surfaces extending rearward from the front surface, and the pair of skis are connected to the frame through the side surfaces of the nose cone. In a preferred embodiment, the nose cone, the pair of side panels, and the hood are all connected to each other at least at one point.

In another preferred embodiment, the nose cone, the pair of side panels, and the hood preferably are all connected to each other at multiple points or along an entire surface or substantially an entire surface of at least one of the nose cone, the pair of side panels, and the hood.

According to a preferred embodiment of the present invention, the nose cone is a single, unitary panel covering a front most area of the front portion of the snowmobile. Preferably, the pair of side panels and the hood are removably attached to the nose cone.

According to a preferred embodiment of the present invention, the pair of side panels are adjacent to the engine, the pair of side panels include at least one fastening mechanism configured to attach the pair of side panels to the snowmobile, and the at least one fastening mechanism is configured such that the pair of side panels are attachable to and detachable from the snowmobile by hand and without the use of a tool.

According to a preferred embodiment of the present invention, the hood includes at least one fastening mechanism configured to attach the hood to the snowmobile, and the at least one fastening mechanism is configured such that the hood is attached to and detached from the snowmobile with the use of a tool.

Preferably, the pair of side panels and the hood partially overlap with the nose cone, and the pair of side panels partially overlap with the hood. Preferably, at least two of the nose cone, the pair of side panels, and the hood partially overlap with each other at adjacent portions thereof. By overlapping the pair of side panels and hood with the nose cone, the internal components of the snowmobile are protected from snow and debris.

According to a preferred embodiment of the present invention, the nose cone is attached to a bottom chassis of the snowmobile. Preferably, the nose cone is riveted to the bottom chassis of the snowmobile.

According to a preferred embodiment of the present invention, the pair of side panels or the hood preferably includes at least one vent configured to allow air to access and exit from the engine. The at least one air vent is preferably provided at one or more joints between the pair of side panels, the nose cone, and the hood. Alternatively, the at least one air vent is an opening in the pair of side panels or in the hood.

According to a preferred embodiment of the present invention, the frame preferably includes a plurality of metal tubes. Alternatively, the frame may include a metal structure other than metal tubes.

According to a preferred embodiment of the present invention, the snowmobile preferably includes a pair of A-arms connecting each of a pair of skis to the frame. Preferably, the nose cone covers an area where the pairs of A-arms are located adjacent to the frame. Preferably, the nose cone includes a plurality of openings at locations where the pairs of A-arms are connected to the frame, and each pair of A-arms is connected to a U-shaped portion of the frame. The plurality of plurality of openings preferably include a hole extending through the nose cone, or a notch at an upper edge or a lower edge of the nose cone.

According to a preferred embodiment of the present invention, the snowmobile includes a pair of suspension mechanisms connecting the pair of skis to the frame, wherein the pair of suspension mechanisms are preferably disposed between the pairs of A-arms and the nose cone. Preferably, the pair of suspension mechanisms each include a damping assembly, and the nose cone includes an opening configured to receive a connecting member of the damping assembly to connect the damping assembly to the frame.

According to a preferred embodiment of the present invention, the snowmobile preferably includes a pair of steering rods connected to the pair of skis. The nose cone preferably includes a pair of openings at locations where the pair of rods extend through the nose cone.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 7 is a rear perspective view of the front of the snowmobile according to a preferred embodiment of the present invention

DETAILED DESCRIPTION OF THE PREFERRED EMBODIMENTS

Hereinafter, preferred embodiments of the present invention will be described with reference to the drawings.

Figure 1:
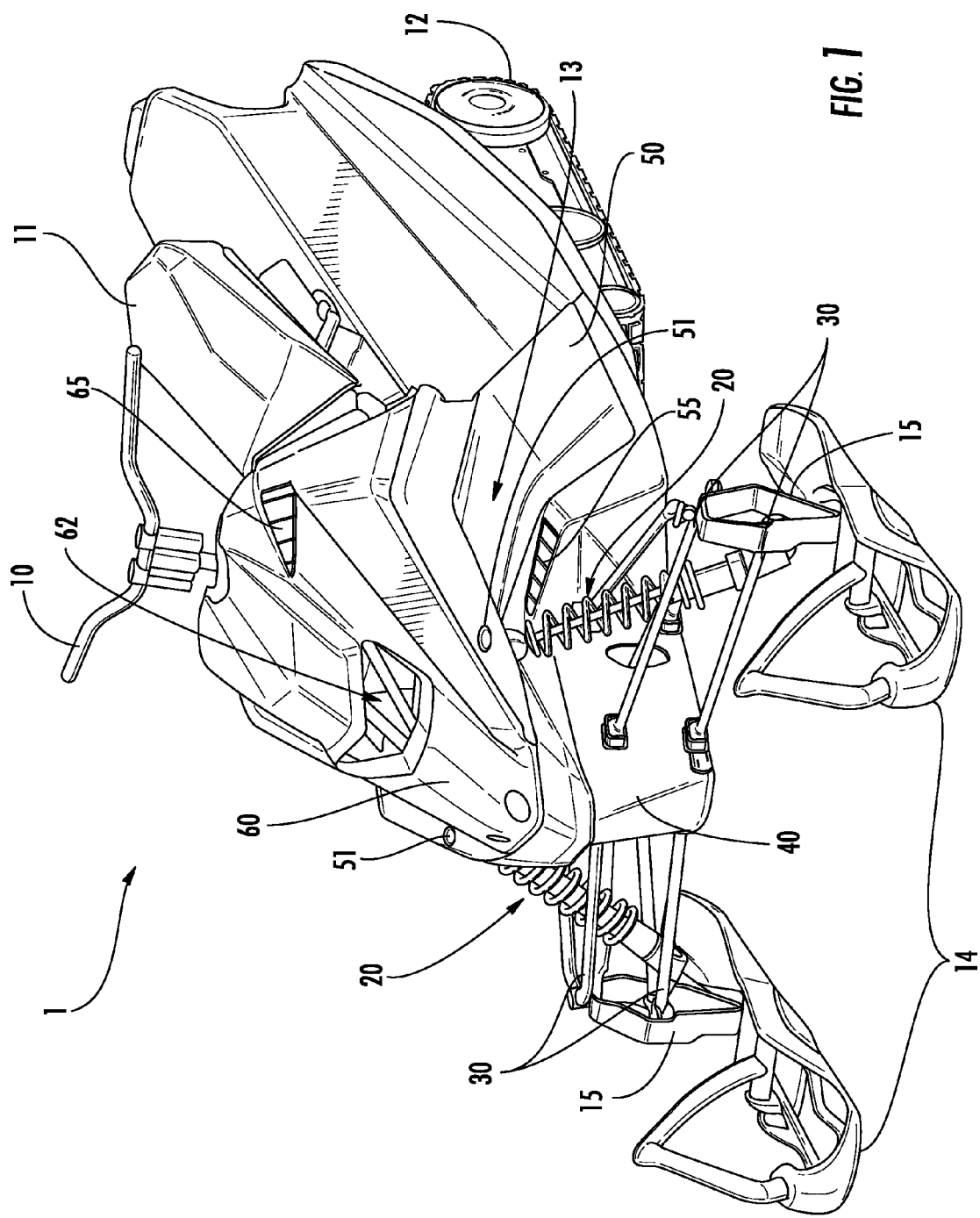
FIG. 1 is a perspective left side and front view of a snowmobile according to a preferred embodiment of the present invention.

FIG. 1 shows a snowmobile 1 according to a preferred embodiment of the present invention. The snowmobile 1 includes a handlebar 10 used to steer a pair of skis 14. The handlebar 10 is indirectly coupled to a pair of steering rods 16 (see FIG. 5), which are coupled to knuckles 15 attached to the tops of the pair of skis 14. A seat 11 upon which the driver and one or more passengers sit is disposed rearward of the handlebar 10.

The snowmobile 1 includes a nose cone 40, a pair of side panels 50, and a hood 60 configured to cover a frame 70 (see FIG. 4) and internal components disposed at the front of the snowmobile 1. Only the left side panel 50 is shown in FIG. 1. An engine 13 is disposed near the front of the snowmobile 1 such that removal of the pair of side panels 50 and/or the hood 60 allows access to the engine 13. The engine 13 is coupled to a track belt 12 that transmits a driving force to the ground surface.

The nose cone 40, the pair of side panels 50, and the hood 60 are preferably made of plastic, such as a thermoplastic polyolefin elastomer. The nose cone 40, the pair of side panels 50, and the hood 60 may be made of the same type of plastic, or may be made of different types of plastic. For example, the nose cone 40, which is preferably more securely mounted to the snowmobile 1 than the pair of side panels 50 and the hood 60, may be made of a more durable and rigid plastic, such as a polypropylene having a low temperature and high impact resistance.

Figure 6:
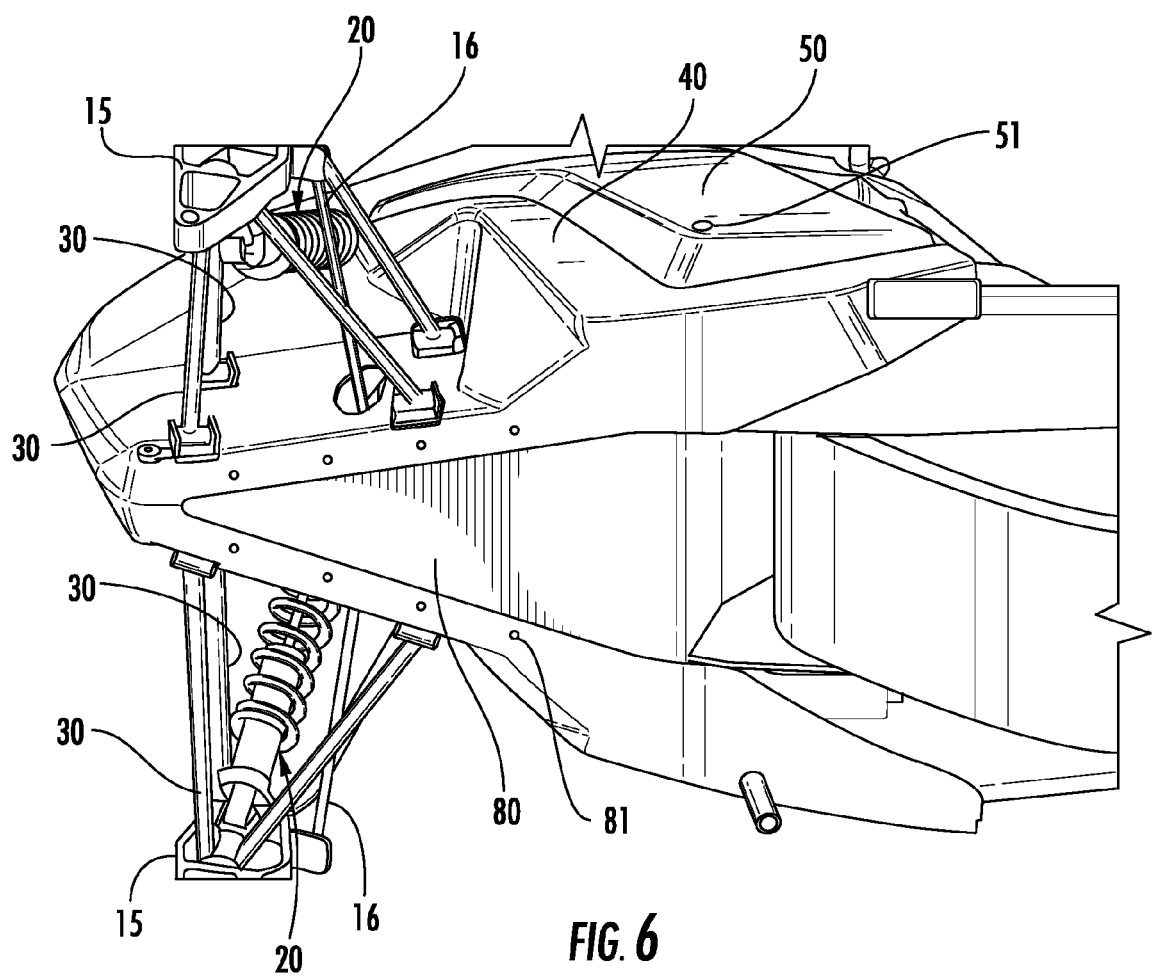
FIG. 6 is a bottom view of the front of the snowmobile according to a preferred embodiment of the present invention.

The nose cone 40 is configured to cover a front most area of the front of the snowmobile 1. The nose cone 40 is preferably mounted to one or more of the metal tubes of the frame 70 and a bottom chassis 80 (see FIG. 6) of the snowmobile 1. The nose cone 40 may be mounted to the frame 70 and the chassis 80 by any known structure including, for example, bolts, screws, plastic rivets, standard (metal) rivets, and grommets. Preferably, the nose cone 40 is rigidly mounted to the bottom chassis 80 by, for example, rivets 81 (see FIG. 6). Preferably, the nose cone 40 includes a front surface and side surfaces extending rearward from the front surface, and the pair of skis 14 are connected to the frame through the side surfaces of the nose cone.

In a preferred embodiment, the nose cone 40, the pair of side panels 50, and the hood 60 are all connected to each other at least at one point.

In another preferred embodiment, the nose cone 40, the pair of side panels 50, and the hood 60 preferably are all connected to each other at multiple points or along an entire surface or substantially an entire surface of at least one of the nose cone 40, the pair of side panels 50, and the hood 60.

The pair of side panels 50 are configured to cover side areas of the snowmobile 1 behind the nose cone 40 and below the hood 60. The pair of side panels 50 are preferably located adjacent to the engine 13 such that the engine 13 is accessed by removing one or both of the pair of side panels 50. The pair of side panels 50 preferably include fastening mechanisms 51 (see FIGS. 6 and 7) that attach the pair of side panels 50 to the nose cone 40 and/or to the hood 60. Alternatively, the fastening mechanisms 51 may attach the side panels 50 to other structure of the snowmobile 1. The fastening mechanisms 51 are designed and configured to be operated without the use of a tool in order to attach and remove the pair of side panels 50 to and from the snowmobile 1. For example, a fastening mechanism 51 may include a rotating element that locks a side panel 50 to the snowmobile 1 if rotated in one direction, and unlocks the side panel 50 from the snowmobile 1 if rotated in the opposite direction. Alternatively, the fastening mechanism may include a flexible (e.g., rubber) strap attached to one of the body pieces and that is configured to be latched onto a hook or tab on another of the body pieces.

The pair of side panels 50 preferably include one or more vents 55 configured to allow air to access and exit from the engine 13. The vents 55 may be an opening through the pair of side panels 50, and/or a gap between the pair of side panels 50 and the nose cone 40, and/or between the pair of side panels 50 and the hood 60.

The hood 60 is configured to cover a top area of the front of the snowmobile 1 behind the nose cone 40 and above the pair of side panels 50. The hood 60 preferably includes at least one fastening mechanism 61 that attaches the hood 60 to the nose cone 40 and/or to the pair of side panels 50. The hood 60 is also preferably connected to a dash 80 (see FIG. 7). Alternatively, the at least one fastening mechanism 61 may attach the hood 60 to other structure or portions of the snowmobile 1. The at least one fastening mechanism 61 is designed and configured to be operated with the use of a simple tool in order to attach and remove the hood 60 to and from the snowmobile 1. For example, the fastening mechanism 61 may be configured to be loosened and/or removed using, for example, a screwdriver, a pair of pliers, or a wrench.

The hood 60 preferably includes a headlight opening 62 configured to mount a headlight therein. The hood 60 may include one or more vents 65 configured to allow air to access and exit from the engine 13. The vents 65 may be an opening through the hood 60, and/or a gap between the hood 60 and the nose cone 40, and/or between the hood 60 and the pair of side panels 50.

Figure 2:
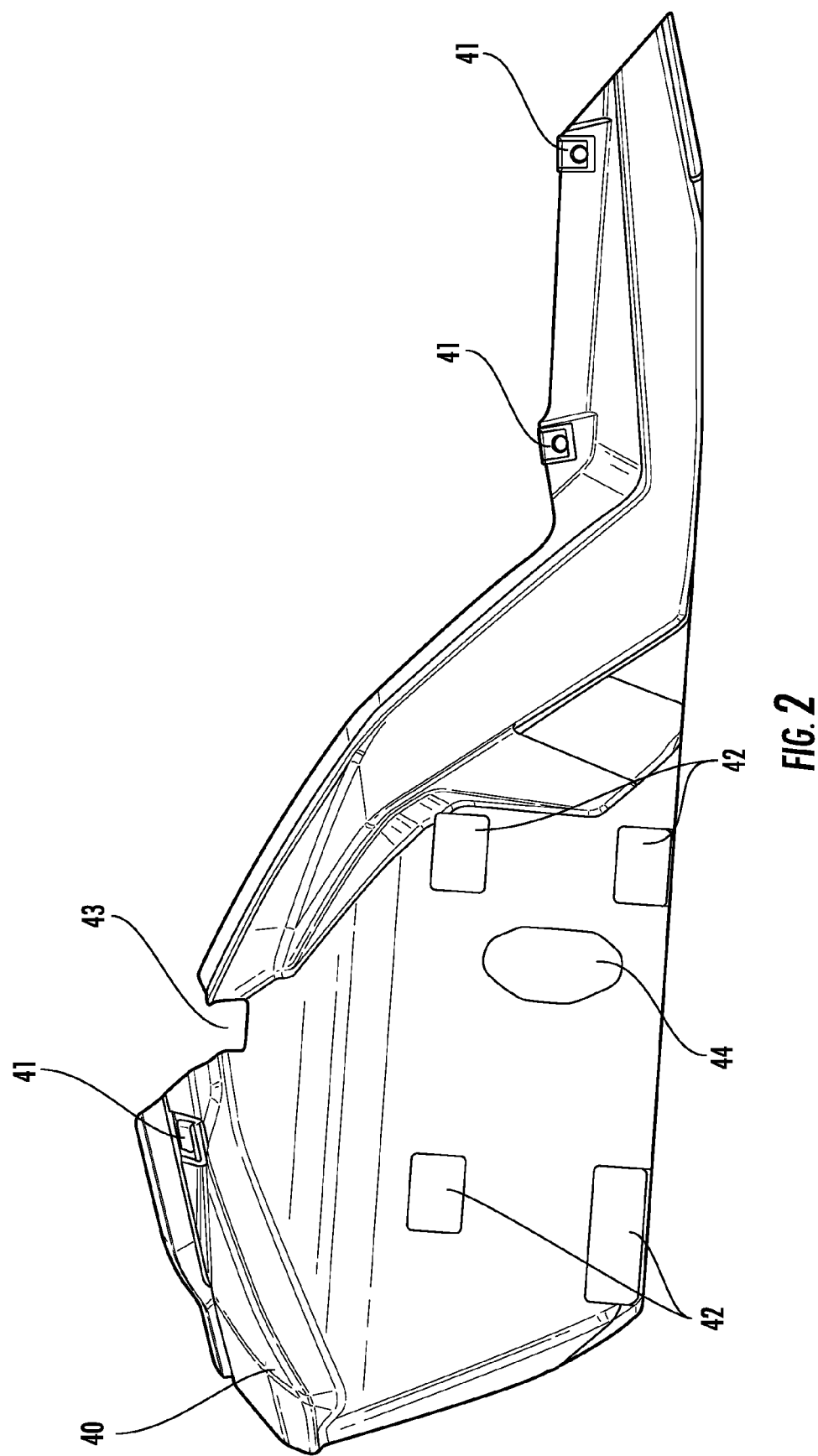
FIG. 2 is a left side view of a nose cone of the snowmobile according to a preferred embodiment of the present invention.
Figure 3:
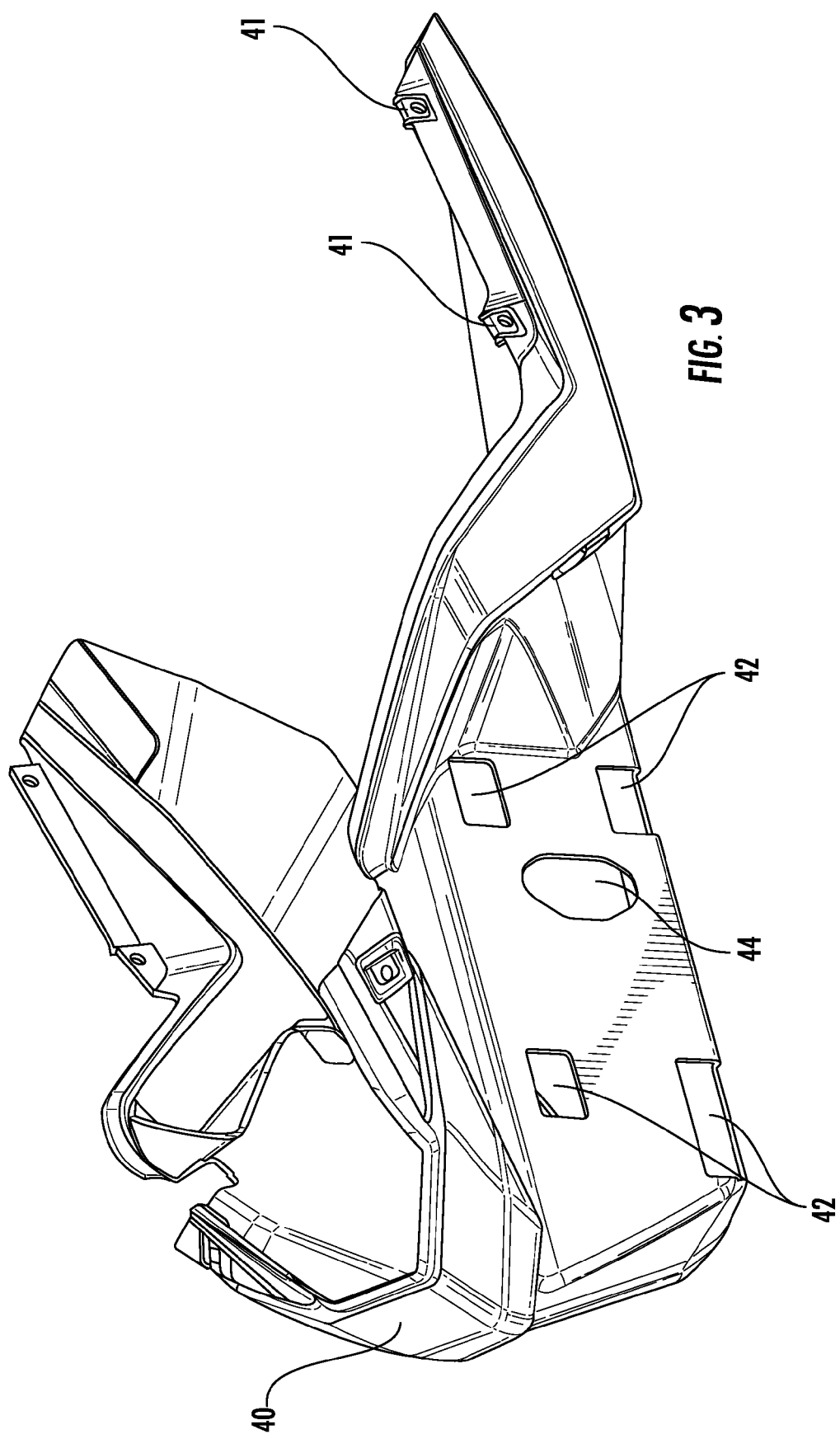
FIG. 3 is a perspective left side and front view of the nose cone according to a preferred embodiment of the present invention.

As shown in FIGS. 2 and 3, the nose cone 40 preferably includes one or more fastening mechanisms 41 that attach the nose cone 40 to the pair of side panels 50 and/or to the hood 60. Preferably, edges of the nose cone 40, the pair of side panels 50, and/or the hood 60 are configured to overlap with each other to prevent snow, melted snow (i.e., water), or other debris from entering the inside of the snowmobile 1. Because the nose cone 40 is preferably securely mounted to the snowmobile 1 and not easily removed from the snowmobile, for reasons explained in further detail below, the one or more fastening mechanisms 41 do not need to be designed and configured such that the nose cone 40 is easily attached to and removed from the snowmobile 1.

Each of the pair of skis 14 is preferably mounted to the snowmobile 1 by a pair of A-arms 30, in particular, an upper A-arm 30 and a lower A-arm 30. For example, the pairs of A-arms 30 are connected to the knuckles 15 at an outermost end of the A-arms 30 and to the frame 70 disposed inside of the nose cone 40 at innermost ends of the A-arms 30. Preferably, each pair of A-arms is connected to a U-shaped portion 71 of the frame 70. Alternatively, the pair of skis 14 may be mounted to the snowmobile 1 by any conventional mounting structure. As shown in FIGS. 2 and 3, the nose cone 40 preferably includes a plurality of openings 42 at locations where the pairs of A-arms 30 are connected to the frame 70. The plurality of openings 42 may include a hole extending through the nose cone.

Figure 4:
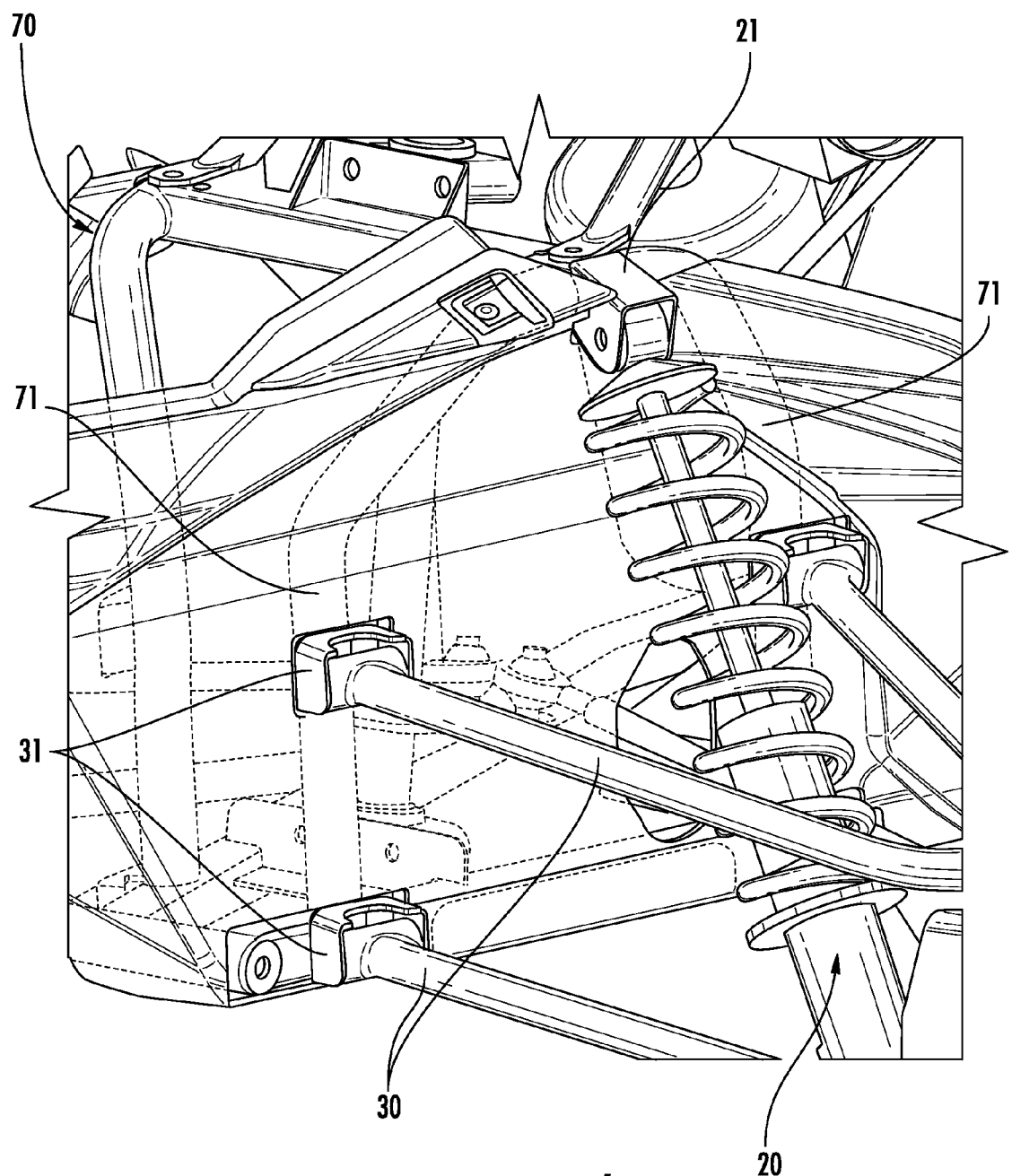
FIG. 4 is a perspective left side and front view of the nose cone covering a frame of the snowmobile, and left side A-arms and left side suspension assembly for a left ski according to a preferred embodiment of the present invention.
Figure 5:
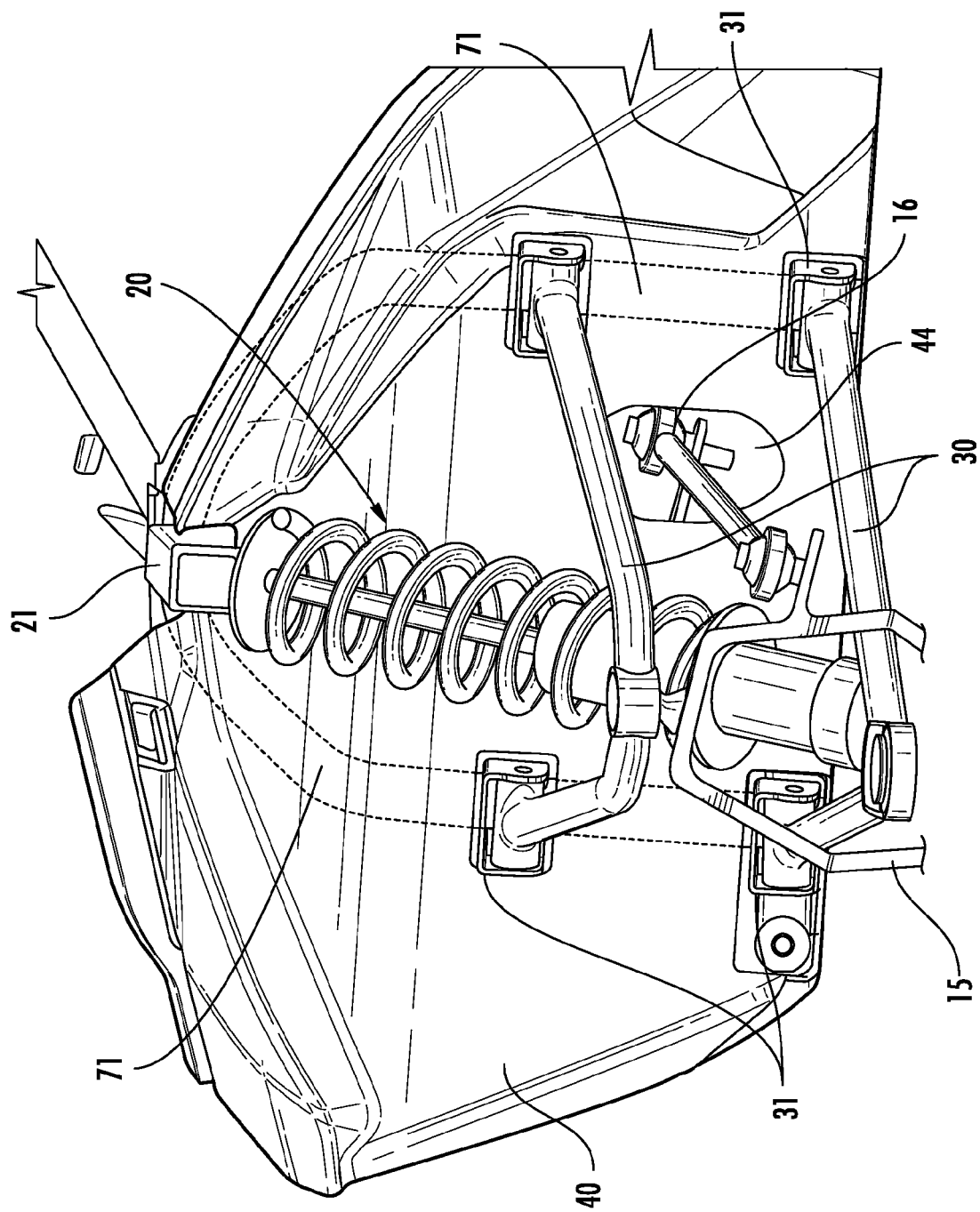
FIG. 5 is a left side view of the nose cone covering the frame of the snowmobile, and the left side A-arms and the left side suspension assembly for the left ski according to a preferred embodiment of the present invention.

As shown in FIGS. 1, 4, and 5, the snowmobile includes a pair of suspension mechanisms 20 connecting the pair of skis 14 to the frame 70. The pair of suspension mechanisms 20 are preferably disposed between the pairs of A-arms 30 and the nose cone 40. The pair of suspension mechanisms 20 may include any conventional dampening structure including, for example, a shock absorber, spring, or other damping elements. The pair of suspension mechanisms 20 are preferably connected to the knuckles 15 of the pair of skis 14 and to the frame 70. As shown in FIG. 2, the upper portions of the pair of suspension mechanisms 20 are preferably connected to the frame 70 through an opening or notch 43 in the nose cone 40. Alternatively, the upper portions of the pair of suspension mechanisms 20 may be connected to the frame 70 through a gap between the nose cone 40 and the side panels 50.

The snowmobile also includes a pair of steering rods 16 connecting a steering mechanism to the pair of skis 14. As shown in more detail in FIGS. 2 and 3, each side of the nose cone 40 includes an opening 44 at the location where the steering rod 16 extends through the nose cone 40.

FIGS. 4 and 5 are enlarged views showing the connections between a pair of the A-arms 30 and the frame 70 and between the suspension mechanism 20 and the frame 70. At locations corresponding to the openings 42 in the nose cone 40, brackets 31 are securely mounted to the frame 70. Innermost portions of the A-arms 30 are pivotally connected to the brackets 31 such that the A-arms 30, and consequently the skis 14, move up and down with the ground surface. The upper portion of the suspension mechanism 20 is pivotally connected to a bracket 21 securely mounted to the frame 70. The bracket 21 is configured to extend through the opening or notch 43 in the nose cone 40.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A snowmobile comprising:
a frame;
an engine mounted on the frame;
a pair of skis connected to the frame; and
a front body including a nose cone, a pair of side panels, and a hood covering a front portion of the frame; wherein
the nose cone, the pair of side panels, and the hood are made of plastic;
the nose cone includes a front surface and side surfaces extending rearward from the front surface, the pair of skis being connected to the frame through a plurality of openings in the side surfaces of the nose cone; and
the nose cone, the pair of side panels, and the hood are all connected to each other at least at one point.

2. The snowmobile according to claim 1, wherein the nose cone is a single, unitary panel covering a frontmost area of the front portion of the snowmobile.

3. The snowmobile according to claim 1, wherein the pair of side panels and the hood are removably attached to the nose cone.

4. The snowmobile according to claim 1, wherein the pair of side panels are arranged laterally of the engine, the pair of side panels include at least one fastening mechanism configured to attach the pair of side panels to the snowmobile, and the at least one fastening mechanism is configured such that the pair of side panels are attached to and detached from the snowmobile by hand and without the use of a tool.

5. The snowmobile according to claim 1, wherein the hood includes at least one fastening mechanism configured to attach the hood to the snowmobile, and the at least one fastening mechanism is configured such that the hood is attached to and detached from the snowmobile with the use of a tool.

6. The snowmobile according to claim 1, wherein the pair of side panels and the hood partially overlap with the nose cone, and the pair of side panels partially overlap with the hood.

7. The snowmobile according to claim 1, wherein at least two of the nose cone, the pair of side panels, and the hood partially overlap with each other at adjacent portions thereof.

8. The snowmobile according to claim 1, wherein the nose cone is attached to a bottom chassis of the snowmobile.

9. The snowmobile according to claim 8, wherein the nose cone is riveted to the bottom chassis of the snowmobile.

10. The snowmobile according to claim 1, where the pair of side panels or the hood includes at least one vent configured to allow air to access and exit from the engine.

11. The snowmobile according to claim 1, further comprising a pair of A-arms connecting each of the pair of skis to the frame; wherein
each pair of A-arms is connected to a U-shaped portion of the frame.

12. The snowmobile according to claim 11, wherein the nose cone covers an area where the pairs of A-arms are located adjacent to the frame.

13. The snowmobile according to claim 11, wherein the nose cone includes the plurality of openings at locations where the pairs of A-arms are connected to the frame.

14. The snowmobile according to claim 13, wherein the plurality of openings include a hole extending through the nose cone.

15. The snowmobile according to claim 11, further comprising:

a pair of suspension mechanisms connecting the pair of skis to the frame; wherein the pair of suspension mechanisms are disposed between the pairs of A-arms and the nose cone.

16. The snowmobile according to claim 15, wherein the pair of suspension mechanisms each include a damping assembly; and the nose cone includes an opening configured to receive a connecting member of the damping assembly to connect the damping assembly to the frame.

17. The snowmobile according to claim 1, further comprising a pair of steering rods connected to the pair of skis, wherein the nose cone includes a pair of openings at locations where the pair of rods extend through the nose cone.

18. A snowmobile comprising:

a frame;

an engine mounted on the frame;

a pair of skis connected to the frame; and a front body including a nose cone, a pair of side panels, and a hood covering a front portion of the frame; wherein the nose cone, the pair of side panels, and the hood are made of plastic;

the nose cone includes a front surface and side surfaces extending rearward from the front surface, the pair of skis being connected to the frame through the side surfaces of the nose cone;

the nose cone, the pair of side panels, and the hood are all connected to each other at least at one point;

the snowmobile includes a pair of A-arms connecting each of the pair of skis to the frame;

the pair of A-arms extend outward from the side surfaces of the nose cone;

at least a front end of the pair of side panels extend farther forward than a rear end of the pair of A-arms; and the front end of the pair of side panels are connected to the nose cone and the hood at the at least one point.

19. The snowmobile according to claim 1, wherein the nose cone, the pair of side panels, and the hood are all connected to each other at multiple points or along an entire surface or substantially an entire surface of at least one of the nose cone, the pair of side panels, and the hood.

* * * * *